(12) United States Patent
Patino et al.

(10) Patent No.: US 7,800,046 B2
(45) Date of Patent: Sep. 21, 2010

(54) LIGHT DETECTION POWER SYSTEM AND METHOD FOR SAME

(75) Inventors: Joseph Patino, Miramar, FL (US); Russell L. Simpson, Miami, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

(21) Appl. No.: 12/361,130

(22) Filed: Jan. 28, 2009

(65) Prior Publication Data

US 2009/0128089 A1 May 21, 2009

Related U.S. Application Data

(62) Division of application No. 10/999,653, filed on Nov. 30, 2004, now Pat. No. 7,486,044.

(51) Int. Cl.
*G01J 1/04* (2006.01)
*G05F 1/00* (2006.01)

(52) U.S. Cl. ............... 250/227.11; 250/214 R; 250/214 AL; 315/291; 315/307

(58) Field of Classification Search ........... 315/224, 315/245, 291, 302, 307, 308; 250/200, 206, 250/214 R, 214 SG, 214 AL, 227.11, 227.28; 340/825.19, 825.2, 825.27; 320/101, 103
See application file for complete search history.

(56) References Cited

U.S. PATENT DOCUMENTS

| | | | |
|---|---|---|---|
| 4,314,198 A * | 2/1982 | Rogers | 323/351 |
| 4,410,930 A | 10/1983 | Yachabach | |
| 4,441,143 A | 4/1984 | Richardson, Jr. | |
| 5,600,121 A | 2/1997 | Kahn et al. | |
| 5,751,133 A * | 5/1998 | Sato et al. | 320/101 |
| 5,801,371 A | 9/1998 | Kahn et al. | |
| 5,829,878 A | 11/1998 | Weiss | |
| 6,018,802 A | 1/2000 | Abe et al. | |
| 6,127,797 A | 10/2000 | Walker | |
| 6,158,662 A | 12/2000 | Kahn et al. | |
| 6,234,394 B1 | 5/2001 | Kahn et al. | |
| 6,376,932 B1 * | 4/2002 | Yang | 307/66 |

(Continued)

OTHER PUBLICATIONS

PCT International Search Report for Application No. PCT/US2005/41046 Dated October 16, 2006 for the parent case U.S. Appl. No. 10/999,653, filed Nov. 30, 2004—7 pages.

(Continued)

*Primary Examiner*—Douglas W Owens
*Assistant Examiner*—Jimmy T Vu
(74) *Attorney, Agent, or Firm*—Larry G. Brown

(57) ABSTRACT

The invention concerns a light detection power system (105). The system can include a solar cell charging circuit (120) having at least one solar cell (116) in which the solar cell charging circuit can provide power to a power source (114), a lighting circuit (122) that receives power from the power source and a controller (118) coupled to the solar cell charging circuit and the lighting circuit. The controller can enable the lighting circuit when a power level that the controller detects from the solar cell charging circuit fails to reach a first predetermined threshold. The solar cell charging circuit can include a switch (130) that is controlled by the controller. The controller can further enable the switch when the power level that the controller detects from the solar cell charging circuit reaches a second predetermined threshold.

7 Claims, 4 Drawing Sheets

U.S. PATENT DOCUMENTS

| | | |
|---|---|---|
| 6,664,744 B2 | 12/2003 | Dietz |
| 7,429,919 B2 * | 9/2008 | Silic et al. ................ 340/539.1 |
| 2001/0013854 A1 | 8/2001 | Ogoro |
| 2002/0021276 A1 | 2/2002 | Park |
| 2004/0204199 A1 | 10/2004 | Zax et al. |
| 2005/0104747 A1 | 5/2005 | Silic et al. |

OTHER PUBLICATIONS

United States Patent and Trademark Office, "Office Action Summary" for U.S. Appl. No. 10/999,653, Apr. 4, 2008, pp. 1-13, Alexandria, Virginia, USA.

* cited by examiner

ID_SYSTEM AND
METHOD FOR SAME

CROSS-REFERENCE TO RELATED
APPLICATION

The present application is a Divisional of allowed application Ser. No. 10/999,653, filed Nov. 30, 2004. Applicants claim priority thereof.

BACKGROUND OF THE INVENTION

1. Field of the Invention

This invention relates in general to portable electronic devices and more particularly, those devices that can detect light.

2. Description of the Related Art

In today's marketplace, consumers have numerous portable electronic devices, such as cellular telephones and personal digital assistants, from which to choose. The companies that manufacture these items are constantly seeking to add new features to them in an effort to drive demand. Unfortunately, this process leads to ever-increasing demands being placed on the rechargeable batteries that typically power these devices. In response, the engineers that design these products have made many advances to help conserve battery life.

As an example, many portable electronic devices include a photodetection circuit that enables such devices to measure lighting conditions. If ambient light levels are high enough, the photodetection circuit disables certain lighting circuits, such as those that light up displays and keypads. Although such an innovation helps rechargeable batteries conserve power, the photodetection circuit takes up valuable space and adds to the expense of portable electronic devices. Removing the photodetection circuit, however, would eliminate the power-saving benefits that are provided.

SUMMARY OF THE INVENTION

The present invention concerns a light detection power system. The system can include a solar cell charging circuit having at least one solar cell in which the solar cell charging circuit can provide power to a power source, a lighting circuit that receives power from the power source and a controller coupled to the solar cell charging circuit and the lighting circuit. The controller can enable the lighting circuit if a power level that the processor detects from the solar cell charging circuit fails to reach a first predetermined threshold.

In addition, the solar cell charging circuit can include a switch that is controlled by the controller. The controller can further enable the switch if the power level that the controller detects from the solar cell charging circuit reaches a second predetermined threshold. In one arrangement, when a low-level lighting condition is exposed to the solar cell, the power level may fail to reach the first predetermined threshold. In another arrangement, when a high-level lighting condition is exposed to the solar cell, the power level may reach at least one of the first predetermined threshold and the second predetermined threshold.

As an example, the lighting circuit can be a backlighting circuit for a mobile communications unit, and the backlighting circuit can illuminate at least one of a display and a keypad. The system can also include a memory that stores a value for the first predetermined threshold and the second predetermined threshold.

As another example, the light detection power system can be contained within a mobile communications unit having a base and a flip cover. The system can further include a position detection circuit coupled to the controller in which the position detection circuit can detect when the flip cover is in a closed position. The controller can also disable the lighting circuit when the position detection circuit detects that the flip cover is in a closed position. In one arrangement, the solar cell charging circuit can provide power to the power source as a supplement to a charger. The controller can further disable the lighting circuit if the power level that the controller detects from the solar cell charging circuit reaches the first predetermined threshold.

The present invention also concerns a mobile communications unit. The mobile communications unit can include a communications circuit for receiving and transmitting communications signals, a solar cell charging circuit having at least one solar cell in which the solar cell charging circuit provides power to a power source, a lighting circuit that receives power from the power source and a controller coupled to the communications circuit, the solar cell charging circuit and the lighting circuit. The controller can enable the lighting circuit if a power level that the controller detects from the solar cell charging circuit fails to reach a first predetermined threshold.

The present invention also concerns a method for detecting lighting conditions. The method can include the steps of receiving ambient light, converting the ambient light to electrical power to produce a power level, selectively providing the electrical power to a power source, determining whether the power level has reached a first predetermined threshold and enabling a lighting circuit if the power level fails to reach the first predetermined threshold.

The method can further include the step of determining whether the power level has reached a second predetermined threshold. In one arrangement, the selectively providing the electrical power step can include providing the electrical power to the power source if the power level has reached the second predetermined threshold. The method can also include the steps of exposing a solar cell to a low-level lighting condition that causes the power level to fail to reach the first predetermined threshold and exposing the solar cell to a high-level lighting condition that causes the power level to reach at least one of the first predetermined threshold and the second predetermined threshold.

As an example and as explained above, the lighting circuit can be a backlighting circuit for a mobile communications unit. The method can include the step of illuminating at least one of a display and a keypad when the lighting circuit is enabled. The method can also include the step of storing in a memory a value for the first predetermined threshold and the second predetermined threshold.

In another arrangement, the method can also include the steps of detecting when a flip cover of a mobile communications unit is in a closed position and disabling the lighting circuit when the flip cover is detected in the closed position. The selectively providing step can further include providing the electrical power to the power source as a supplement to a charger. The method can also include the step of disabling the lighting circuit if the power level reaches the first predetermined threshold.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
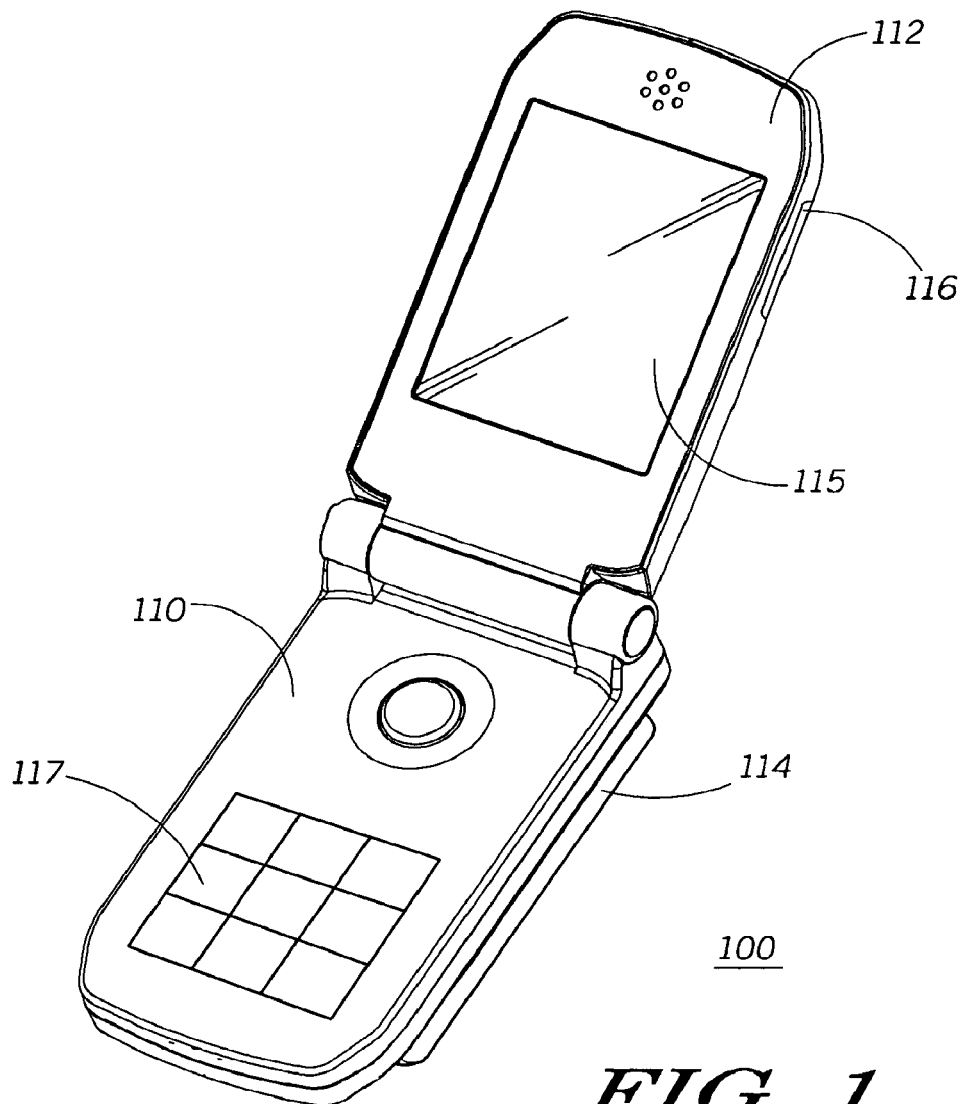
FIG. 1 illustrates an example of a flip-type cellular telephone in an open position in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The invention concerns a light detection power system. The system can include a solar cell charging circuit having at least one solar cell in which the solar cell charging circuit provides power to a power source, a lighting circuit that receives power from the power source and a controller coupled to the solar cell charging circuit and the lighting circuit. The controller can enable the lighting circuit when a power level that the processor detects from the solar cell charging circuit fails to reach a first predetermined threshold.

In addition, the solar cell charging circuit can include a switch that is controlled by the controller. The controller can further enable the switch when the power level that the controller detects from the solar cell charging circuit reaches a second predetermined threshold. In one arrangement, the power level may fail to reach the first predetermined threshold when a low-level lighting condition is exposed to the solar cell. Moreover, the power level can reach at least one of the first predetermined threshold and the second predetermined threshold when a high-level lighting condition is exposed to the solar cell.

Figure 2:
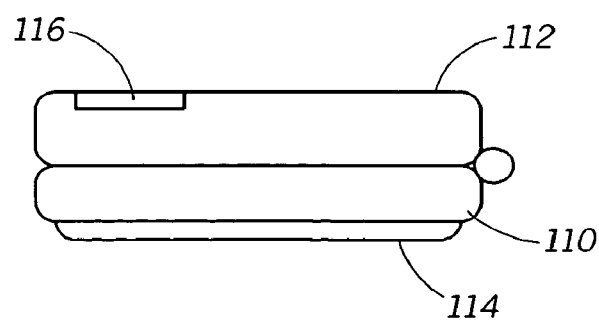
FIG. 2 illustrates an example of a flip-type cellular telephone in a closed position in accordance with an embodiment of the inventive arrangements.

Referring to FIG. 1, a flip-type cellular telephone 100 is shown. In one arrangement, the telephone 100 can have a base 110, a flip cover 112, a power source 114 (such as a rechargeable battery), a display 115 and a keypad 117. As pictured, the flip cover 112 is shown in an open position, and a solar cell 116 can be incorporated into the flip cover 112 or some other suitable portion of the telephone 100. As is known in the art, the solar cell 116 can convert light into electrical energy, and as will be explained below, this electrical energy can power, for example, the power source 114. The flip cover 112 can also be placed in a closed position, an example of which is shown in FIG. 2.

Figure 3:
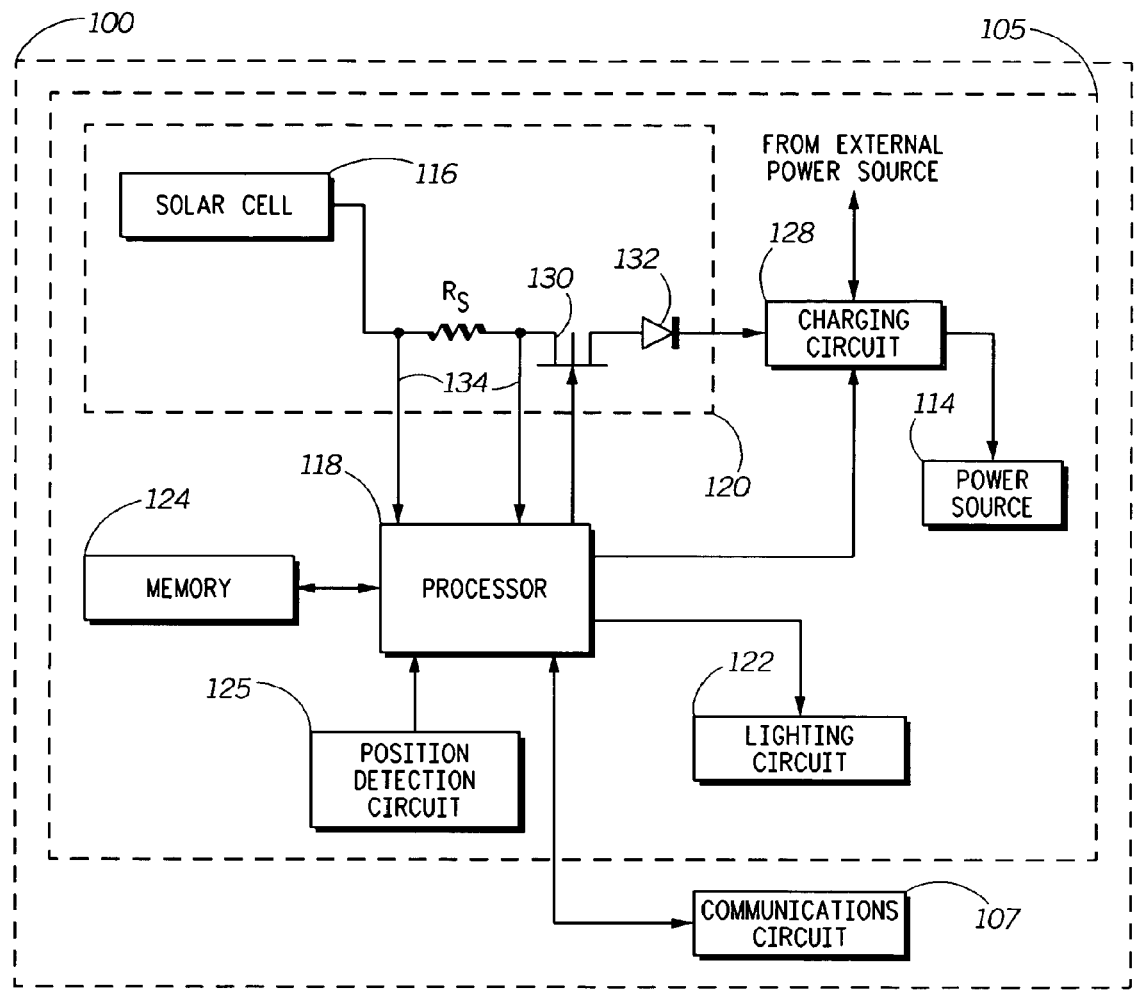
FIG. 3 illustrates an example of a block diagram of a light detection power system in accordance with an embodiment of the inventive arrangements.

Referring to FIG. 3, a block diagram of a light detection power system 105 is shown. The light detection power system 105 can be incorporated in a mobile communications unit, such as the cellular telephone 100. It is understood, however, that the light detection power system 105 can be implemented into any other suitable electronic device. In one arrangement, the light detection power system 105 can include a controller 118, a solar cell charging circuit 120, a lighting circuit 122, a memory 124 and a position detection circuit 125, to all of which the controller 118 can be coupled. As an example, the controller 118 can be a unit capable of being programmed to perform functions in accordance with the inventive arrangements. In another arrangement, the controller 118 can be an analog circuit that can perform these functions.

The light detection power system 105 may also include the power source 114 and a charging circuit 128 for providing charging current to the power source 114. Those of skill in the art will appreciate that the charging circuit 128 can be any suitable circuit for providing power to the power source 114 from a charger or some other external power source (not shown). The processor 118 can control the operation of the charging circuit 128. The cellular telephone 100 can include a communications circuit 107 for transmitting and receiving communications signals. The operation of such circuits is well known, and a discussion is not warranted here.

The solar cell 116 may be part of the solar cell charging circuit 120, and the solar cell charging circuit 120 can also include a sense resistor $R_s$, a switch 130 and a diode 132. The controller 118 can have two inputs 134 on either side of the sense resistor $R_s$ and can be coupled to the switch 130. Through this configuration, the controller 118 can determine the voltage at the sense resistor $R_s$ and can control the operation of the switch 130. The solar cell charging circuit 120 can be coupled to the charging circuit 128, which, as will be described below, can enable the solar cell charging circuit 120 to provide charging current to the power source 114.

The lighting circuit 122 can be any circuit that can illuminate one or more other electrical components. In one particular arrangement, the lighting circuit 122 can be a backlighting circuit that can illuminate the display 115 and the keypad 117 (see FIG. 1). Additionally, the controller 118, based on certain circumstances that will be described later, can activate or deactivate the lighting circuit 122 for illuminating or deilluminating electrical components, such as the display 115 or the keypad 117. In another arrangement, the memory 124 can store values that can be accessed by the controller 118 to enable the controller 118 to determine when to activate or deactivate components in the light detection power system 105, which will be explained below. Also, the position detection circuit 125 can determine, for example, whether the flip cover 112 is in an open position or a closed position. The position detection circuit 125 can signal the controller 118 with this information.

Figure 4:
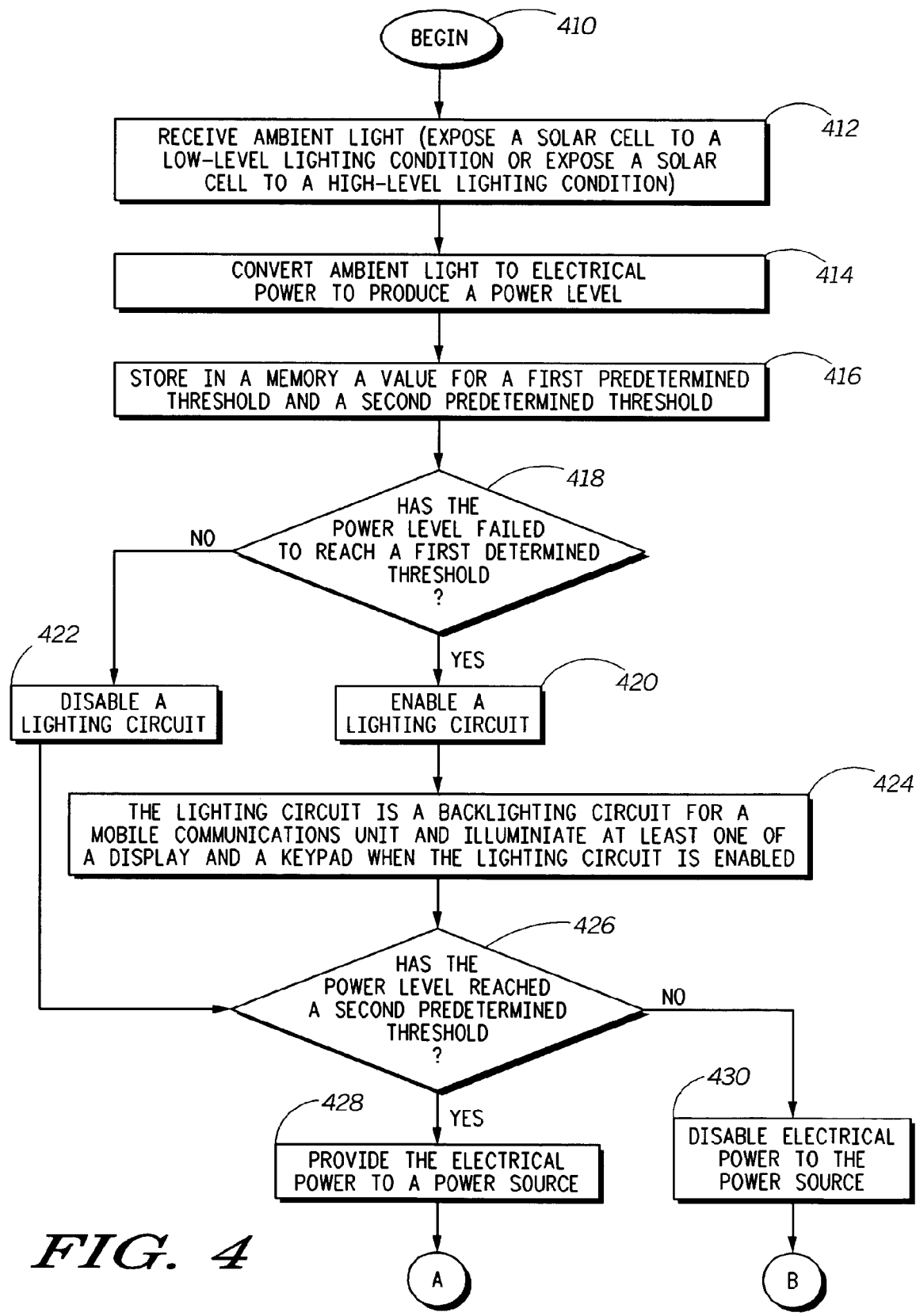
FIG. 4 illustrates a portion of a method of operating a light detection power system in accordance with an embodiment of the inventive arrangements.

Referring to FIG. 4, a method 400 of operation for a light detection power system is shown. To describe the method 400, reference will be made to FIGS. 1-3, although it is understood that the method 400 can be implemented in any other suitable device or system. Moreover, the invention is not limited to the order in which the steps are listed in the method 400. In addition, the method 400 can contain a greater or a fewer number of steps than those shown in FIG. 4.

At step 410, the method 400 can begin. At step 412, ambient light can be received, and this step can include, for example, exposing a solar cell to a low-level lighting condition or exposing the lighting condition to a high-level lighting condition. At step 414, the ambient light can be converted to electrical power to produce a power level. Further, a value for a first predetermined threshold and a second predetermined threshold can be stored in a memory, as shown at step 416. At decision block 418, it can be determined whether the power level has failed to reach a first predetermined threshold. If it has, then at step 420, a lighting circuit can be enabled. As an example, the lighting circuit can be a backlighting circuit, and at least one of a display and a keypad can be illuminated when the lighting circuit is enabled. If the power level has reached the first predetermined threshold, however, the lighting circuit can be disabled at step 422, and the method 400 can resume at the decision block 426.

For example, referring to FIGS. 1-3, ambient light can be received at the light detection power system 105, such as at the solar cell 116, which can be part of the flip-type cellular telephone 100. For purposes of the invention, the term ambient light can refer to any light that is produced from any source other than the component that houses the light detection power system 105. In one arrangement, receiving the ambient light can include exposing the solar cell 116 to either a high-level lighting condition or a low-level lighting condition, each of which will be described below. The solar cell 116 can convert the received ambient light to electrical power to produce a power level, as those of skill in the art can appreciate. The power level can be any measurement that is indicative of the intensity of the ambient light that is reaching the solar cell 116, such as a voltage or current level.

A value for a first predetermined threshold and a second predetermined threshold can be stored in the memory 124. As an example, the value for the first predetermined threshold and the second predetermined threshold can be a voltage value or a current value. Although shown as a separate component, it is important to note that the memory 124 may also be part of the controller 118, if so desired. The controller 118 can determine whether the power level produced by the solar cell 116 has failed to reach the first predetermined threshold. The failure of the power level to reach the first predetermined threshold can indicate that the lighting detection power system 105 is in a poorly-lit environment. As an example, the controller 118, through the inputs 134, can detect a voltage or a current at the sense resistor $R_s$. The controller 118 can then access from the memory 124 the values for the first and second predetermined thresholds and can compare the stored values with the measured values.

In one arrangement, if the controller 118 determines that the power level has not reached the first predetermined threshold, the controller 118 can enable the lighting circuit 122. For example, the first predetermined threshold may be a voltage value of 1 volt. If the controller 118 determines, through the inputs 134, that the power level that is generated by the solar cell 116 is below one volt, the controller 118 can activate the lighting circuit 122. In one arrangement and as noted earlier, the lighting circuit 122 may be a backlighting circuit, which can illuminate the display 115 or the keypad 117. It is important to note that the first predetermined threshold is not limited to a voltage value, as any other suitable measurement that may indicate that the light detection power system 105 is in a poorly-lit environment can serve as the first predetermined threshold.

This process can illuminate certain components of a device containing the solar cell 116 when the environment in which the device is situated is poorly lit. As mentioned above, the poor lighting condition can be reflected by the low power level produced by the solar cell 116. Thus, in accordance with an embodiment of the inventive arrangements, the low-lighting condition can be associated with a low power level, and for purposes of the invention, a low-lighting condition can be any lighting condition that causes the solar cell 116 to produce a power level that is below the first predetermined threshold.

If the controller 118 determines that the power level has reached the first predetermined threshold, the controller 118 can disable or deactivate the lighting circuit 122. If the power level reaches the first predetermined level, this step may serve as an indication that the light detection power system 105 is in a well-lit environment, which can obviate the need for illuminating components like the display 115 or the keypad 117. Thus, a high-level lighting condition can be any lighting condition that at least causes the solar cell 116 to generate a power level that reaches the first predetermined threshold.

Figure 5:
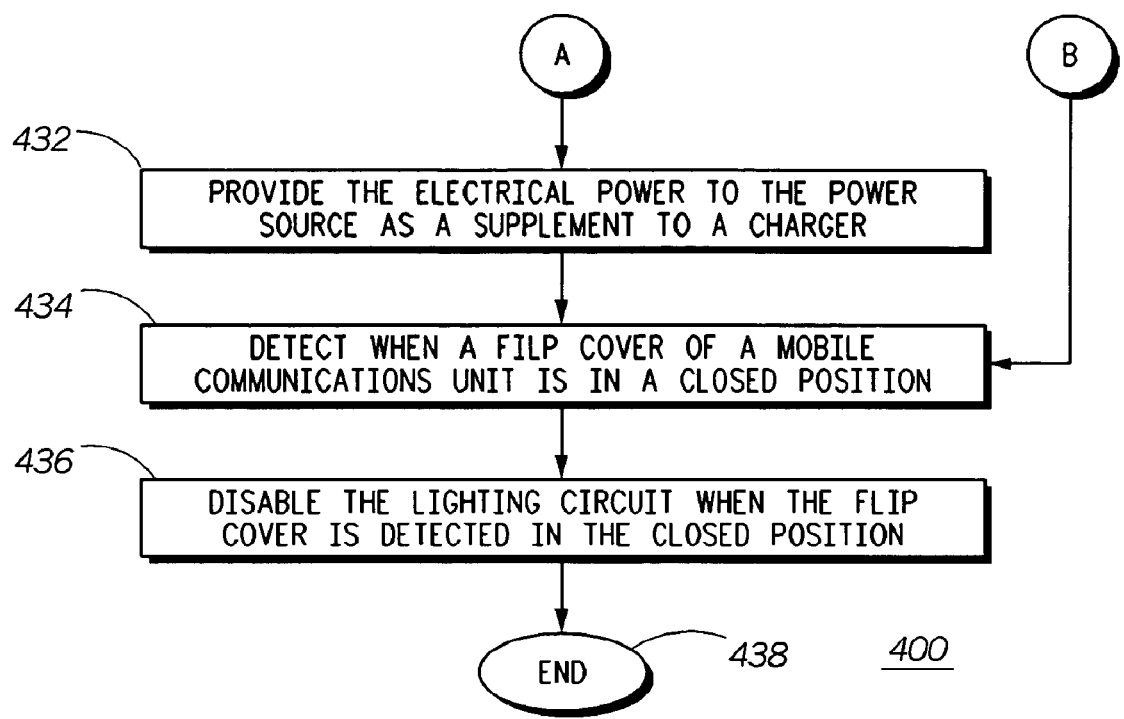
FIG. 5 illustrates another portion of a method of operating a light detection power system in accordance with an embodiment of the inventive arrangements.

Referring back to FIG. 4, at decision block 426, it can be determined whether the power level has reached a second predetermined threshold. If it has, then electrical power can be provided to a power source, as shown at step 428. At step 432, through jump circle A and shown in FIG. 5, the electrical power can be provided to the power source as a supplement to a charger. Conversely, if the power level has not reached the second predetermined threshold, then the electrical power to the power source can be disabled, as shown at step 430. Further, at step 434 (in FIG. 5 through jump circle B from step 430), it can be detected when a flip cover of a mobile communications unit is in a closed position. At step 436, the lighting circuit can be disabled when the flip cover is detected in the closed position. The method 400 can end at step 438.

For example, referring once again to FIGS. 1-3, the controller 118, similar to the procedure described above, can determine whether the power level produced by the solar cell 116 has reached the second predetermined threshold. The second predetermined threshold, as an example, can also be a voltage or current level, as measured at the inputs 134. If the power level has reached the second predetermined threshold, then the controller 118 can activate the switch 130. This step can permit current to flow from the solar cell 116 to the power source 114. In one arrangement, the power that the solar cell 116 generates can supplement the power received from a charger, such as an external charger that can provide charging current to the charging circuit 128. Of course, the light detection power system 105 can be designed such that the solar cell 116 provides charging current to the power source 114 by itself or in combination with any other suitable component(s).

The second predetermined threshold can be any measurement that may permit the solar cell charging circuit 120 to provide power to the power source 114. For example, the second predetermined threshold can be a voltage that equals the present voltage charge on the power source 114 plus any incremental voltage drops that result from charging current passing through circuit components, such as diodes and switches. As a more specific example, assume that the present charge on the power source 114 is three volts. The second predetermined threshold, in this example, can be three volts plus any voltage that is lost to overcome the voltage drops from the switch 130, the diode 132 and similar components in the charging circuit 128, if they exist. Because the solar cell 116 may produce a higher power level as the intensity of the light that is captured increases, a high-level lighting condition may also include any lighting condition that causes the power level to reach the second predetermined threshold.

Because the light detection power system 105 may be housed within a flip-type cellular telephone 100, it may be useful to selectively deactivate the lighting circuit 122 based on certain events. For example, if the flip cover 112 is in the closed position, it may be unnecessary to activate the lighting circuit 122, even if the solar cell 116 is being exposed to a low-level lighting condition. The position detection circuit 125 can detect when the flip cover 112 is in the closed position and can signal the controller 118 with this information. In response, the controller 118 can disable the lighting circuit 122. Of course, this position detection may apply to any other component that houses the solar light detection power system 105, and the invention is not limited to this particular example.

Where applicable, the present invention can be realized in hardware, software or a combination of hardware and software. Any kind of computer system or other apparatus adapted for carrying out the methods described herein are suitable. A typical combination of hardware and software can be a mobile communication device with a computer program that, when being loaded and executed, can control the mobile communication device such that it carries out the methods described herein. The present invention can also be embedded in a computer program product, which comprises all the features enabling the implementation of the methods described herein and which when loaded in a computer system, is able to carry out these methods.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for detecting lighting conditions, comprising the steps of:
    receiving ambient light;
    converting the ambient light to electrical power to produce a power level;
    providing the electrical power to a power source;
    determining whether the power level has reached a first predetermined threshold;
    enabling a lighting circuit if the power level fails to reach the first predetermined threshold;
    exposing a solar cell to a low-level lighting condition that causes the power level to fail to reach the first predetermined threshold; and
    exposing the solar cell to a high-level lighting condition that causes the power level to reach at least one of the first predetermined threshold and the second predetermined threshold.

2. The method according to claim 1, further comprising the step of determining whether the power level has reached the second predetermined threshold and the providing the electrical power step comprises providing the electrical power to the power source if the power level has reached the second predetermined threshold.

3. The method according to claim 1, wherein the lighting circuit is a backlighting circuit for a mobile communications unit and the method further comprises the step of illuminating at least one of a display and a keypad when the lighting circuit is enabled.

4. The method according to claim 2, further comprising the step of storing in a memory a value for the first predetermined threshold and the second predetermined threshold.

5. The method according to claim 1, further comprising the steps of:
    detecting when a flip cover of a mobile communications unit is in a closed position; and
    disabling the lighting circuit when the flip cover is detected in the closed position.

6. The method according to claim 1, wherein the providing step further comprises providing the electrical power to the power source as a supplement to a charger.

7. The method according to claim 1, further comprising the step of disabling the lighting circuit if the power level reaches the first predetermined threshold.

* * * * *